Patented Feb. 16, 1937

2,070,602

UNITED STATES PATENT OFFICE 2,070,602

SELECTIVE HYDROLYSIS OF MIXED ORGANIC ACID ESTERS OF CELLULOSE

William O. Kenyon and Russel H. Van Dyke, Rochester, N. Y., assignors, by mesne assignments, to Eastman Kodak Company, Jersey City, N. J., a corporation of New Jersey No Drawing. Application April 25, 1934, Serial No. 722,251

5 Claims. (Cl. 260—102)

The present invention relates to the regulation of the hydrolysis of mixed organic acid esters of cellulose containing acetyl and higher acyl groups so that the relative rates of hydrolysis of the respective acetyl and higher acyl groups may be varied with reference to each other.

One object of our invention is to provide a method of controlling the ratio of the higher acyl groups to the acetyl groups, which may be hydrolyzed off from a mixed organic acid ester of cellulose. Another object of our invention is to make possible the obtaining of product having the desired acetyl, higher acyl and hydroxyl contents.

The hydrolysis of mixed organic acid esters of cellulose whose acyl content comprises at least 15% of higher acyl is the invention of C. J. Malm and C. L. Fletcher and is disclosed and claimed in their application Serial No. 551,546 filed July 17, 1931. However, in the process which they describe the hydrolysis is induced merely by adding aqueous acetic acid to the reaction mixture. Thus the composition of that hydrolysis bath depends on the proportion of ingredients employed in the esterification bath which in turn determines the acetyl and higher acyl content of the ester formed so that the composition of the hydrolysis bath is related to the acetyl and higher acyl contents of the ester which is hydrolyzed when the hydrolysis is carried out by adding aqueous acid to the reaction mixture. For example it is not possible in a process in which hydrolysis is carried out by merely adding aqueous acetic acid to the reaction mixture containing the ester, to hydrolyze off a greater proportion of propionyl than acetyl groups from a cellulose acetate propionate having a low percentage of acetyl, providing of course the starting material of the esterification was cellulose per se due to the fact that the proportion of propionyl and butyryl groups to the total acyl content of the bath determines the acyl ratio of the resulting ester. Thus the bath in which the cellulose acetate propionate having a low acetyl content is produced has a predominant amount of propionyl groups therein and even though dilute acetic acid is added thereto the acetyl groups will be hydrolyzed off the more rapidly as the bath is predominantly propionyl. Likewise it is not possible by that method, to hydrolyze off the acetyl groups in greater amount than the propionyl groups from a cellulose acetate propionate in which the acetyl predominates.

We have found that if a cellulose acetate-higher acylate is subjected to the hydrolyzing action of acetic acid and water that the higher acyl groups will hydrolyze off more rapidly than the acetyl while on the other hand if the ester is subjected to the action of a hydrolyzing bath comprising propionic or butyric as the predominant acid present and water, the acetyl groups will hydrolyze off more rapidly than the higher acyl groups. We have found that starting from a single mixed ester of cellulose such as a cellulose acetate propionate or acetate butyrate, hydrolyzed products having varying contents of acetyl and higher acyl groups may be obtained.

Our invention may be carried out by treating a mixed organic acid ester of cellulose containing acetyl groups in solid form with a hydrolyzing bath comprising acetic or the higher acid corresponding to the higher acyl of the ester, (where that higher acid is compatible with the other ingredients of the bath) or a mixture of the acetic with at least one of the higher acids in the desired proportions according to the composition desired in the resulting product. In cases where the cellulose ester is in solution in one or the other or a mixture of these acids the present invention is also applicable, as when the ester is in solid form it must be dissolved before the hydrolysis is carried out. When the solvent is a mixture of acetic and the higher fatty acid the composition of the mixture should be known.

In some cases the higher acid is not compatible in more than a certain quantity with a hydrolyzing bath. Obviously in that case, only hydrolyzing baths containing amounts of the higher acid up to the maximum amount compatible therein, are within the contemplation of the invention.

The following examples illustrate processes of hydrolyzing a mixed ester of cellulose, containing acetyl and higher acyl groups, embodying the present invention:

Example I 95 lbs. of cellulose acetate propionate were dissolved in 470 lbs. of glacial acetic acid and a hydrolyzing mixture consisting of 42 lbs. of glacial acetic acid, 26 lbs. of water and 2.3 lbs. of sodium bisulfate monohydrate was added thereto. The whole was maintained at 53° C. and samples were removed at intervals. These were precipitated, washed and dried and were analyzed as indicated below:

| Time of hydrolysis (hrs.) | Percent apparent acetyl | Percent of acyl groups based on total acyl | |
|---|---|---|---|
| | | Acetyl | Propionyl |
| 0 | 43.0 | 69.5 | 30.5 |
| 24 | 43.0 | 66.0 | 34.0 |
| 48 | 42.3 | 70.4 | 29.6 |
| 72 | 41.8 | 68.8 | 31.2 |
| 96 | 41.7 | 70.3 | 29.7 |
| 168 | 40.6 | 71.2 | 28.8 |
| 216 | 40.0 | 72.0 | 28.0 |

It will be noted that at first the propionyl content gains at the expense of the acetyl. Although it has been recognized that in the hydrolysis of cellulose acetate, during the first part of the process, the acetyl content increases if an increase in acetyl content is possible, however in that case acetic acid is present in the bath. The present phenomena can hardly be considered analogous thereto and with the present state of the art it does not appear that an explanation therefor is forthcoming. It will be noted that in Example II a similar phenomena occurred except that the conditions were the converse of those in Example I.

*Example II*

95 lbs. of cellulose acetate propionate were dissolved in 550 lbs. of propionic acid and a hydrolyzing mixture consisting of 40 lbs. of propionic acid, 26 lbs. of water and 2.3 lbs. of sodium bisulfate monohydrate was added thereto. The whole was maintained at 53° C., samples were removed at intervals and these were precipitated, washed, dried and analyzed. The results obtained were as follows:

| Time of hydrolysis (hrs.) | Percent apparent acetyl | Percent of acyl groups based on total acyl | |
|---|---|---|---|
| | | Acetyl | Propionyl |
| 0 | 43.0 | 69.5 | 30.5 |
| 24 | 42.0 | 70.3 | 29.7 |
| 48 | 39.7 | 67.8 | 32.2 |
| 72 | 37.7 | 63.7 | 36.3 |
| 96 | 36.7 | 59.5 | 40.5 |
| 168 | 33.4 | 51.0 | 49.0 |
| 216 | 32.2 | 42.0 | 58.0 |

*Example III*

95 lbs. of cellulose acetate propionate were dissolved in a mixture consisting of 345 lbs. of propionic acid, 55.5 lbs. of 99% acetic anhydride and 55.5 lbs. of glacial acetic acid. A hydrolizing mixture consisting of 42 lbs. of glacial acetic acid, 26 lbs. of water, 2.3 lbs. of sodium bisulfate monohydrate and 3 lbs. of a mixed catalyst consisting of 1 parts by volume of sulfuric acid and 3 parts by volume of phosphoric acid was added thereto and the whole was maintained at a temperature of 53° C. Samples were removed and analyzed as before with the following results:

| Time of hydrolysis (hrs.) | Percent apparent acetyl | Percent of acyl groups based on total acyl | |
|---|---|---|---|
| | | Acetyl | Propionyl |
| 0 | 43.0 | 69.5 | 30.5 |
| ½ | 42.8 | 68.0 | 32.0 |
| 6½ | 42.0 | 66.0 | 34.0 |
| 22 | 40.0 | 64.7 | 35.3 |
| 30 | 38.9 | 61.7 | 35.3 |
| 46 | 37.5 | 59.2 | 40.8 |
| 70 | 35.4 | 53.7 | 46.3 |
| 118 | 32.7 | 50.3 | 49.7 |

*Example IV*

95 lbs. of cellulose acetate propionate were dissolved in 470 lbs. of glacial acetic acid and a hydrolyzing mixture consisting of 42 lbs. of glacial acetic acid, 26 lbs. of water, 2.3 lbs. of sodium bisulfate monohydrate and 3.7 lbs. of mixed catalyst (1 part by volume of sulfuric to 3 parts by volume of phosphoric acid) was added thereto. The resulting mixture was maintained at a temperature of 53° C. and samples were removed at intervals and the ester therein precipitated out, washed, dried and analyzed with the following results:

| Time of hydrolysis (hrs.) | Percent apparent acetyl | Percent of acyl groups based on total acyl | |
|---|---|---|---|
| | | Acetyl | propionyl |
| 0 | 43.1 | 69.5 | 30.5 |
| 24 | 41.3 | 69.6 | 30.4 |
| 48 | 39.2 | 64.6 | 35.4 |
| 72 | 37.4 | 75.75 | 24.25 |
| 144 | 33.6 | 81.65 | 18.35 |
| 168 | 33.5 | 83.85 | 16.15 |

*Example V*

95 lbs. of cellulose acetate propionate were dissolved in 550 lbs. of propionic acid and a hydrolyzing mixture consisting of 40 lbs. of propionic acid, 26 lbs. of water, 2.3 lbs. of sodium bisulfate monohydrate and 3.7 lbs. of mixed catalyst (1 sulfuric: 3 phosphoric by volume) was added to the solution. The resulting mixture was maintained at 53° C. and samples were removed at intervals, the ester therein being precipitated out, washed, dried and analyzed with the following results:

| Time of hydrolysis (hrs.) | Percent apparent acetyl | Percent of acyl groups based on total acyl | |
|---|---|---|---|
| | | Acetyl | Propionyl |
| 0 | 43.1 | 69.5 | 30.5 |
| 24 | 38.55 | 64.15 | 35.85 |
| 48 | 34.6 | 51.6 | 48.4 |
| 72 | 31.9 | 41.5 | 58.5 |
| 144 | 28.3 | 25.35 | 74.65 |
| 168 | 28.0 | 25.6 | 74.4 |

*Example VI*

100 lbs. of cellulose acetate butyrate were dissolved in 472 lbs. of acetic acid and a mixture consisting of 42 lbs. of glacial acetic acid, 26 lbs. of water, 2.3 lbs. of sodium bisulfate monohydrate and 3.7 lbs. of the sulfuric-phosphoric catalyst was added thereto. The mass was maintained at 53° C., and samples were removed at intervals, the ester therein being precipitated out, washed, dried and analyzed with the following results:

| Time of hydrolysis (hrs.) | Percent apparent acetyl | Percent of acyl groups based on total acyl | |
|---|---|---|---|
| | | Acetyl | Butyryl |
| 0 | 41.65 | 74.0 | 26.0 |
| 24 | 40.55 | 74.0 | 26.0 |
| 48 | 38.8 | 74.5 | 25.5 |
| 72 | 37.0 | 75.15 | 24.85 |
| 96 | 35.2 | 75.4 | 24.6 |
| 192 | 32.25 | 80.8 | 19.2 |

*Example VII*

100 lbs. of cellulose acetate butyrate were dissolved in 600 lbs. of butyric acid and a mixture consisting of 40 lbs. of butyric acid, 26 lbs. of water, 2.3 lbs. of sodium bisulfate monohydrate and 3.7 lbs. of the sulfuric-phosphoric catalyst was added. The mass was maintained at 53° C. and samples were removed at intervals, the ester therein being precipitated out, washed, dried and analyzed with the following results:

| Time of hydrolysis (hrs.) | Percent apparent acetyl | Percent of acyl groups based on total acyl | |
|---|---|---|---|
| | | Acetyl | Butyryl |
| 0 | 41.65 | 74.0 | 26.0 |
| 24 | 40.1 | 74.05 | 25.95 |
| 48 | 36.45 | 67.3 | 32.7 |
| 72 | 35.7 | 65.7 | 34.3 |
| 96 | 33.1 | 61.15 | 38.85 |
| 192 | 27.2 | 43.35 | 56.65 |

It is to be noted in Example III the hydrolysis was carried out in a mixture of acetic and propionic acids, however due to the fact that the amount of propionic acid predominates the acetyl groups were hydrolyzed off more rapidly than the propionyl groups. It is also to be noted that the hydrolysis in this example proceeded more rapidly than in the hydrolysis of Example II which was due to the presence of mineral acids therein. The effect the proportion of sulfuric acid to the cellulose in the hydrolysis bath exerts on the speed of the hydrolysis is the discovery of C. J. Malm and C. L. Fletcher and is disclosed and claimed in their application Serial No. 651,138. Due to the fact that a mixture of acetic and propionic acids was employed in Example III, the acetyl groups were not hydrolyzed off as rapidly in proportion to the apparent acetyl content as was the case in Example II in which propionic acid only was employed.

Example VIII

The present invention is applicable to the hydrolysis of the esters the higher acyl of which corresponds to an organic acid which is compatible in but a small proportion with the hydrolyzing bath, however, due to this fact the use of a hydrolyzing bath substantially comprising the higher acid is not possible. However, the relative hydrolysis of the respective groups can be governed between the limits of hydrolyzing baths in which acetic is the sole organic acid present and in which the highest percentage of the higher acid compatible with the hydrolyzing bath is present.

500 gms. of a cellulose acetate stearate having an acetyl content of 26.5% and a stearyl content of 37.7% is completely dispersed at 25° C. in 4 liters of glacial acetic acid. To this dispersion is added the following mixture to hydrolyze the ester:

2 l. glacial acetic acid
  12 gms. sodium bisulfate monohydrate
  130 cc. water
  20 cc. of a catalyst consisting of a mixture of 1 part of sulfuric acid and 3 parts of phosphoric acid by volume.

The whole is agitated to render it homogeneous and it may be placed in an environment having a temperature of 50–55° C. Samples may be removed at intervals, precipitated and washed with methyl alcohol, washed with ether, dried and analyzed. The following results are obtained:

| Time of hydrolysis (hrs.) | Percent acetyl | Percent stearyl | Ratio of stearyl to acetyl groups |
|---|---|---|---|
| 0 | 26.5 | 37.7 | 1.42:1 |
| 18 | 26.1 | 36.9 | 1.415:1 |
| 42 | 25.2 | 36.8 | 1.46:1 |
| 62 | 25.2 | 36.6 | 1.455:1 |
| 85 | 24.3 | 36.4 | 1.5:1 |

Example IX 400 gms. of a cellulose acetate phthalate having an acetyl content of 23.4% and a phthalyl content of 20.6% is dissolved in 2 l. of glacial acetic acid and hydrolyzed at 50–55° C. by adding the following hydrolyzing mixture:

200 cc. glacial acetic acid
  120 gms. sodium bisulfate monohydrate
  130 cc. water
  10 cc. of sulfuric-phosphoric acid catalyst (1 part $H_2SO_4$ to 3 parts $H_3PO_4$ by volume).

Samples may be removed at selected time intervals, precipitated and washed in distilled water until the wash water shows no acidity. Upon analysis the following results are obtained:

| Time of hydrolysis (hrs.) | Percent acetyl | Percent phthalyl | Ratio of phthalyl to acetyl groups |
|---|---|---|---|
| 0 | 23.4 | 20.6 | .88:1 |
| 8 | 19.7 | 17.5 | .89:1 |
| 32 | 20.1 | 18.5 | .92:1 |
| 56 | 18.5 | 19.2 | 1.04:1 |
| 80 | 19.4 | 21.0 | 1.08:1 |

A second sample is hydrolyzed in the same manner except that 80 gms. of phthalic acid is added to the dope before the hydrolysis is started. The following results are obtained:

| Time of hydrolysis (hrs.) | Percent acetyl | Percent phthalyl | Ratio of phthalyl to acetyl groups |
|---|---|---|---|
| 0 | 23.4 | 20.6 | .88:1 |
| 8 | 20.0 | 18.3 | .92:1 |
| 32 | 17.7 | 19.3 | 1.09:1 |
| 56 | 17.9 | 19.8 | 1.1:1 |
| 80 | 16.4 | 21.2 | 1.29:1 |

Some of the phenomena observed is inexplicable however it is apparent that the presence of the higher acid in each case causes the ratio of higher acyl to acetyl groups in the ester to increase more than is the case where that higher acid is absent. It might be presumed from the above results that the analysis was rather inaccurate however such is not necessarily the case as in view of our knowledge of the variations which may occur in the acetyl content of a cellulose acetate during its hydrolysis it seems reasonable to presume that this variation is inherent in the particular hydrolysis in which it occurs.

It is to be understood that the rate of removal of the acyl groups will vary in accordance with various conditions. As shown in Example III, when the mineral acid content of the hydrolysis bath is increased, other things being equal, the speed of hydrolysis is also increased. When the temperature of the bath is lowered the rate of hydrolysis is decreased and upon increase of temperature the hydrolysis rate is increased although danger from degradation of cellulose presents itself at too high a temperature. Nevertheless in any given hydrolysis bath the relative rate at which the acetyl and the higher acyl groups are hydrolyzed off may be regulated by adjusting the relative proportions of acetic and higher acid therein.

We claim as our invention:
1. A process for hydrolyzing mixed monocarboxylic acid esters of cellulose containing both acetyl and acyl groups of 3-4 carbon atoms which comprises partially hydrolyzing the ester in a bath essentially consisting of water, catalyst and a single fatty acid of 2-4 carbon atoms, corresponding to one of the acyl groups in the ester, thereby removing acyl groups from the cellulose ester which do not correspond to the fatty acid employed in the hydrolyzing bath.

2. A process for hydrolyzing mixed monocarboxylic acid esters of cellulose containing both acetyl and acyl groups of 3-4 carbon atoms which comprises partially hydrolyzing the ester in a bath essentially consisting of water, catalyst and acetic acid, thereby removing acyl groups of 3-4 carbon atoms from the cellulose ester.

3. A process for hydrolyzing cellulose acetate propionate which comprises partially hydrolyzing the ester in a bath essentially consisting of water, catalyst and acetic acid, thereby removing propionyl groups from the ester.

4. A process for hydrolyzing cellulose acetate propionate which comprises partially hydrolyzing that ester in a bath essentially consisting of water, catalyst and propionic acid, thereby removing acetyl groups from the cellulose ester.

5. A process for hydrolyzing cellulose acetate butyrate which comprises partially hydrolyzing the ester in a bath essentially consisting of water, catalyst and butyric acid, thereby removing acetyl groups from the ester.

WILLIAM O. KENYON.
RUSSEL H. VAN DYKE.